US012665756B2

(12) United States Patent

Holzbaur et al.

(10) Patent No.: US 12,665,756 B2

(45) Date of Patent: Jun. 23, 2026

(54) JUST-IN-TIME POST-QUANTUM CRYPTOGRAPHY (PQC) KEY EXPANSION

(71) Applicant: Infineon Technologies AG, Neubiberg (DE)

(72) Inventors: Lukas Holzbaur, Munich (DE); Manuela Meier, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 503 days.

(21) Appl. No.: 18/317,399

(22) Filed: May 15, 2023

(65) Prior Publication Data

US 2024/0388431 A1 Nov. 21, 2024

(51) Int. Cl.
*H04L 9/08* (2006.01)
*H04L 9/30* (2006.01)
*H04L 9/06* (2006.01)

(52) U.S. Cl.
CPC .......... *H04L 9/0877* (2013.01); *H04L 9/0852* (2013.01); *H04L 9/0869* (2013.01); *H04L 9/3093* (2013.01); *H04L 9/0631* (2013.01); *H04L 2209/122* (2013.01)

(58) Field of Classification Search
CPC ....... H04L 9/08; H04L 9/0877; H04L 9/0869; H04L 9/0852; H04L 9/06; H04L 9/0631; H04L 9/30; H04L 9/3093; H04L 2209/122
See application file for complete search history.

(56) References Cited

U.S. PATENT DOCUMENTS

| | | | | |
|---|---|---|---|---|
| 10,015,010 B2 * | 7/2018 | Gueron | ................. | H04L 9/0625 |
| 12,174,971 B1 * | 12/2024 | Kovac | .................... | G06F 21/72 |
| 2009/0245505 A1 * | 10/2009 | Wang | ........................ | G06F 7/57 |
| | | | | 708/208 |
| 2020/0042746 A1 * | 2/2020 | Avanzi | ................... | H04L 9/088 |

(Continued)

OTHER PUBLICATIONS

Karmakar, Angshuman, Jose Maria BermudoMera, Sujoy Sinha Roy, and Ingrid Verbauwhede. "Saber on ARM CCA—Secure Module Lattice-Based Key Encapsulation on ARM." Cryptology EPrintArchive, 2018.

(Continued)

*Primary Examiner* — Shaqueal D Wade-Wright

(74) *Attorney, Agent, or Firm* — Banner & Witcoff, Ltd.

(57) ABSTRACT

The described techniques address issues associated with current post-quantum cryptography (PQC) algorithms by providing a more efficient means of key expansion. Architectures are provided for both an accelerator and an expander, which may be implemented in accordance with any suitable type of cryptographic algorithm that utilizes key expansion, such as PQC algorithms, a key encapsulation mechanism (KEM) algorithm, a Digital Signature Algorithm (DSA), etc. The accelerator architecture enables portions of the expanded key to be generated only when required by a processing block, allowing for the reuse of memory, which allows for a reduction in memory size and thus a smaller footprint (i.e. physical size) compared to conventional architectures. The expander architecture reduces the required interactions and data transfers between the processing block and the key expansion block, thereby reducing the load on the processing block and system components, such as shared buses and bridges.

25 Claims, 6 Drawing Sheets

(56) References Cited

U.S. PATENT DOCUMENTS

| | | | | |
|---|---|---|---|---|
| 2020/0177380 A1* | 6/2020 | Prince | ........... | H04L 9/0869 |
| 2024/0154817 A1* | 5/2024 | Marcatel | ........... | H04L 9/3247 |
| 2024/0267212 A1* | 8/2024 | Ghosh | ........... | H04L 9/3093 |

OTHER PUBLICATIONS

H. Nejatollahi, N. Dutt, S. Ray, F. Regazzoni, I. Banerjee, and R. Cammarota, "Post-. quantum lattice-based cryptography implementations: A survey," ACM Computing Surveys (CSUR), vol. 51, No. 6, pp. 1-41, 2019.

U. Banerjee, T. S. Ukyab, and A. P. Chandrakasan, "Sapphire: A Configurable. Crypto-Processor for Post-Quantum Lattice-based Protocols (Extended Version)," p. 56, 2019.

S. S. Roy and A. Basso, "High-speed instruction-set coprocessor for lattice-based. key encapsulation mechanism: Saber in hardware," IACR Transactions on Cryptographic Hardware and Embedded Systems, pp. 443-466, 2020.

J. M. B. Mera, F. Turan, A. Karmakar, S. S. Roy, and I. Verbauwhede, Compact. domain-specific co-processor for accelerating module lattice-based key encapsulation mechanism. 2020. Accessed: Nov. 30, 2022. [Online]. Available: https://eprint.iacr.org/2020/321.

A. Aikata, A. C. Mert, M. Imran, S. Pagliarini and S. S. Roy, "KaLi: A Crystal for Post-Quantum Security Using Kyber and Dilithium," in IEEE Transactions on Circuits and Systems I: Regular Papers, vol. 70, No. 2, pp. 747-758, Feb. 2023, doi: 10.1109/TCSI.2022.3219555.

* cited by examiner

500

600

JUST-IN-TIME POST-QUANTUM CRYPTOGRAPHY (PQC) KEY EXPANSION

TECHNICAL FIELD

The aspects described herein generally relate to the use of secure data communications and, more particularly, to the use of a secure communications that utilize a key expansion process that may be implemented for post-quantum cryptography (PQC) with increased efficiency.

BACKGROUND

Public-Key Cryptography (PKC) is an essential part of modern security concepts, and is used in a variety of automotive applications such as key exchange and software update verification. However, the security assumptions of current PKC algorithms, such as the Rivest-Shamir-Adleman cryptosystem and Elliptic-Curve Cryptography (ECC), no longer hold once sufficiently large quantum computers become available. For this reason, considerable effort has been made to find successors to the cryptographic algorithms that are also secure against malicious attacks via quantum computers.

To consolidate these efforts, PQC algorithms have been developed such as CRYSTALS-KYBER for key-encapsulation mechanisms (KEM), as well as CRYSTALS-DILITHIUM, FALCON, and SPHINCS+ for Digital Signature Algorithms (DSAs). The security of CRYSTALS-KYBER, CRYSTALS-DILITHIUM, and FALCON (as well as other conventional PQC algorithms e.g. NTRU and SABER) is based on mathematical problems related to (module-) lattices, and offer a good trade-off between performance, key size, and security. However, the public and private key, as well as the ciphertext/signature that are used for PQC algorithms, are still considerably larger than those used for current PKC algorithms. This issue is further complicated when considering the need for storage of intermediate values in the several schemes, e.g., CRYSTALS-KYBER and CRYSTALS-DILITHIUM, since parts of the key are expanded from a seed and increase in size significantly. This is particularly an issue in embedded applications and, in particular, in dedicated HW accelerators, as the additional memory and configuration overhead become very costly.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Again, the conventional architectures used in conjunction with the execution of PQC algorithms have various drawbacks, particularly with respect to the processing power, memory, overhead, and time required to generate the expanded keys. For instance, a conventional PQC algorithm functions to receive a seed as an input and then uses this seed to generate an expanded key. Doing so requires the use of an additional amount of memory equal to the entire size of the expanded key, which may be orders of magnitude larger than that of the seed.

The embodiments provided herein address these issues by providing a more efficient means of key expansion for use in various cryptographic algorithms. Specifically, and as further discussed below, architectures are disclosed for both an accelerator and an expander, which may be implemented in accordance with any suitable type of cryptographic algorithm that utilizes key expansion, such as PQC algorithms, a key encapsulation mechanism (KEM) algorithm, a Digital Signature Algorithm (DSA), etc. The accelerator architecture enables portions of the expanded key to be generated by a processing block only when required, and allows for the reuse of memory to reduce memory size and thus provide a smaller footprint (i.e. physical size) compared to conventional architectures. Furthermore, the embodiments discussed herein are directed to an improved expander architecture, which reduces the required interactions and data transfers between the processing block and the expander, thereby reducing the load on the processing block and system components, such as shared busses and bridges.

DETAILED DESCRIPTION

In the following description, numerous specific details are set forth to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

I. Technology Overview: POC Accelerator Architecture

Figure 1:
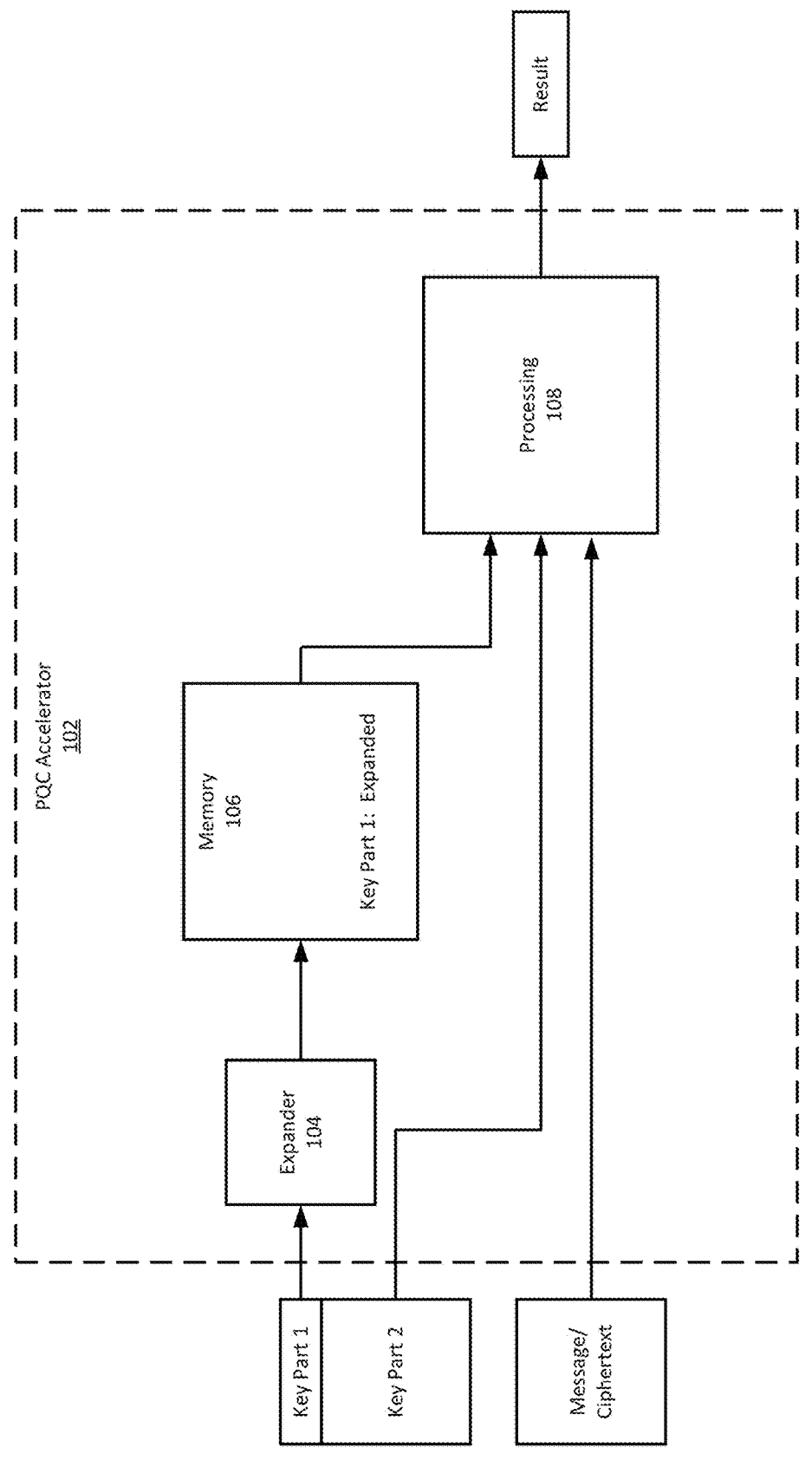
FIG. 1 illustrates a block diagram of a conventional PQC accelerator architecture.

FIG. 1 illustrates a block diagram of a conventional PQC accelerator architecture. The PQC architecture 100 as shown in FIG. 1 illustrates an example key expansion process that is conventionally used by various PQC algorithms. To do so, the PQC architecture 100 includes a PQC accelerator 102, which comprises an expander block 104, a memory 106, and a processing block 108. The processing block 108 may comprise processing logic, processing circuitry, etc., configured to execute one or more predetermined functions in accordance with the particular algorithm for which the PQC accelerator 102 is configured to operate. For instance, the processing block 108 may be configured to perform verification (e.g. for the purposes of authentication), encryption, decryption, etc., with respect to a received message or ciphertext, as the case may be. The processing block 108 may thus facilitate the performance of various "primitives" in accordance with the various cryptographic functions that are executed. For example, for a Digital Signature Algorithm (DSA), such primitives may comprise key generation, signing, and verification. As another example, for a key encapsulation mechanism (KEM), such primitives may comprise key generation, encapsulation or encryption, decapsulation or decryption, etc. To perform these functions, the processing block 108 accesses the expanded key (key part 1 expanded) from the memory 106 and uses the expanded key for these functions.

To generate the expanded key, the expander 104 may comprise hardware circuitry configured to execute predetermined expansion functions on a received seed value, which is shown in FIG. 1 as a portion (key part 1) of a larger key that comprises key part 1 and key part 2. Thus, the predetermined expansion function may be executed in accordance with a specific type of PQC algorithm. For example, the PQC accelerator 102 may be implemented as a SHAKE-128 HW accelerator, and the expander 104 and processing block 108 may execute their respective functions in accordance with the SHAKE-128 based functions.

As shown in FIG. 1, the expander 104 receives a seed (i.e. key part 1) at its input and generates an expanded key, which is stored in the memory 106. Using this conventional approach, the memory 106 is required to be of a size that is capable of storing the entirety of the expanded key, even when the memory 106 is shared by the expander 104 and the processing block 108. In other words, the conventional PQC accelerator architecture utilizes the expander 104 and processing block 108, which do not implement additional internal memory to store the expanded key. Thus, such solutions require the addition of the memory 106, which needs to be large enough to store the expanded key values. This requirement for the memory 106 limits the application of such conventional PQC accelerator architectures, particularly with respect to small, low cost, and/or embedded applications.

To better illustrate this issue, an illustrative example is provided for CRYSTALS-DILITHIUM, which is a digital signature scheme that is strongly secure under chosen message attacks based on the "hardness" of lattice problems over module lattices. The security notion means that an adversary having access to a signing oracle cannot produce a signature of a message whose signature has not yet been seen, nor produce a different signature of a message that has already been observed in the signed state. CRYSTALS-DILITHIUM was selected as a winner of a recent competition of candidate algorithms submitted to the National Institute of Standards and Technology (NIST) post-quantum cryptography project, and is now in the process of becoming a new standard. Sec https://csrc.nist.gov/Projects/post-quantum-cryptography/selected-algorithms-2022.

The following example is provided for case of explanation with respect to the verification subroutine of the CRYSTALS-DILITHIUM signature scheme. However, it is noted that the following also applies to other suitable schemes. The example process is also simplified for case of explanation and to highlight the relevant steps. For instance, to perform a verification of a signature $\sigma=(z,c)$ for the message M using the public key $pk:=(\rho, t)$, the most important step is the computation of $w:=Az-ct$. Here, $A \in R_q^{k \times \ell}$ is a matrix over a polynomial ring $R_q=\mathbb{Z}[X]\backslash(X^n+1)$, which is generated by expanding each entry via $a_{i,j}=\text{Expand}(\rho,i,j)$. As an illustrative example, for the parameters considered in the official submission of CRYSTALS-DILITHIUM, each element in this polynomial ring is of degree n=256 and each of these coefficients is an integer<q with q=8380417, which can be represented by 23 bits as 8380417 is slightly less than the full range of $2^23-1$ that could be covered by a 23-bit integer.

Thus, using the parameters suggested in the official submission as an example, the public key is a combination of $\rho$ and t. Thus, the "key part 1" that is shown in FIG. 1 and further discussed herein with respect to the other Figures refers to $\rho$, as the public key is represented by 32 bytes (the size of $\rho$) plus 2560 bytes (the size of t). However, when expanding the entire matrix, the memory required to hold this expanded public key is 41216 bytes (the size of A) plus 2560 bytes (the size of t). Therefore, while the public key is only 2592 bytes, or ~2.6 kB, the size of the memory 106 required to store the intermediate values is 43776 bytes, or ~43.8 kB.

II. Technology Overview: Expander Architecture

Figure 2:
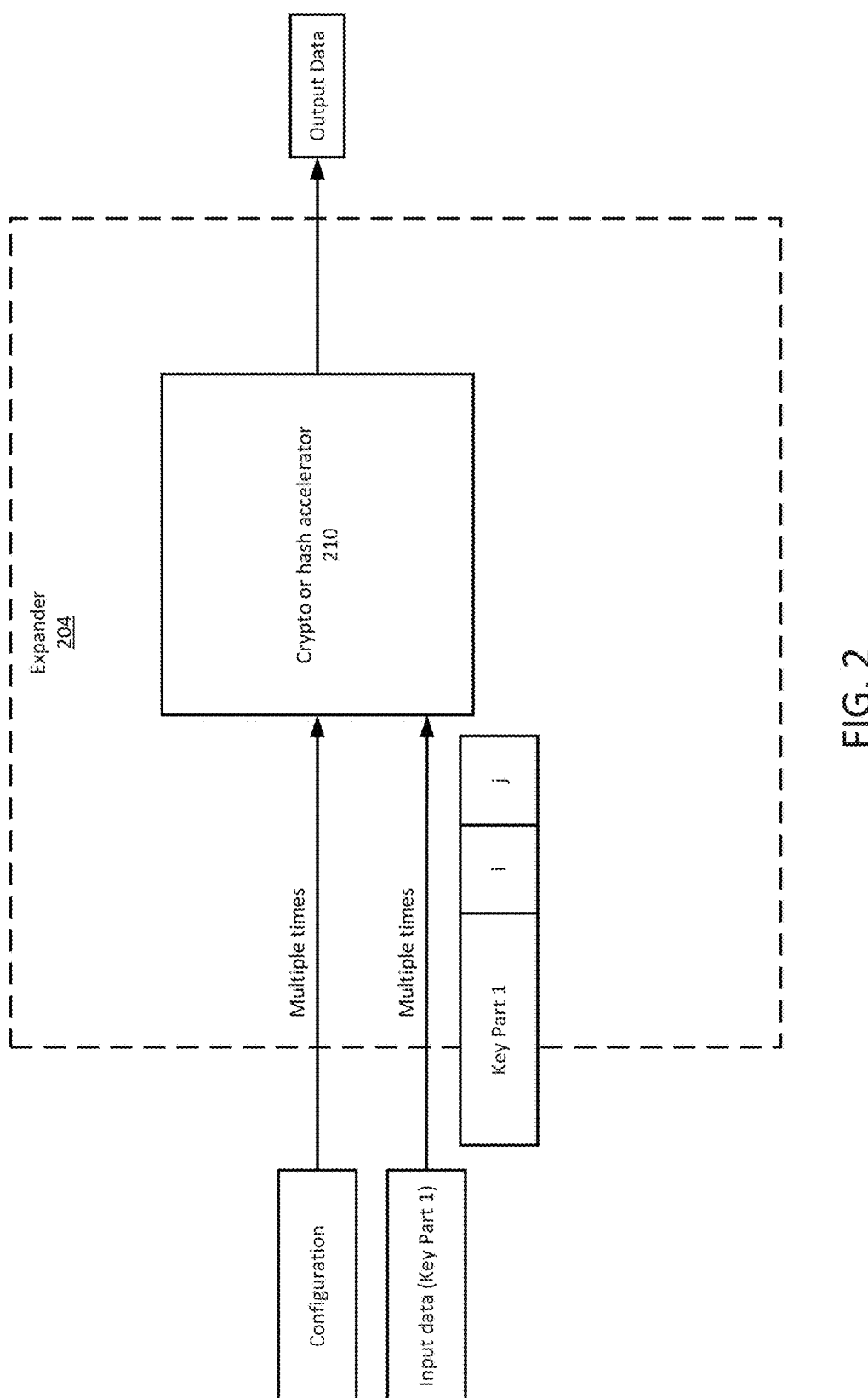
FIG. 2 illustrates a block diagram of a conventional PQC expander architecture.

FIG. 2 illustrates a block diagram of a conventional PQC expander architecture. The PQC expander architecture 200 as shown in FIG. 2 comprises an expander 204, which may be identified with the expander 104 as shown and discussed above with respect to the PQC accelerator 102. However, it is noted that although the PQC accelerator architecture 100 as shown in FIG. 1 was described in terms of the expander 104 and the processing block 108 working closely together, many conventional systems also implement "loosely" coupled security satellites. In general, such loosely-coupled satellites comprise an input buffer, cryptographic primitives, and an output buffer. With respect to the expander 204 as shown in FIG. 2, the input and output buffers are not shown for purposes of brevity, but the input buffer(s) may be identified with any suitable buffers implemented by the expander 204 to temporality store the configuration data and the input data (the key part 1) that is received by the crypto or hash accelerator block 210 as shown in FIG. 2. The output buffer(s) may be identified with any suitable buffers implemented by the expander 204 to temporality store the output data generated by the crypto or hash accelerator block 210. Thus, the crypto or hash accelerator block 210 may apply the cryptographic primitives that are configured in accordance with the received configuration data, and which consume the input data (e.g. the key part 1) and write a result (i.e. the output data) according to their respective configuration to the output buffer (i.e. the output data).

Thus, conventional acceleration of cryptographic operations is realized by implementing dedicated crypto or hash accelerators, which are represented in FIG. 2 as the crypto or hash accelerator block 210. Typically, these accelerators perform a single crypto or hash operation, as described in further detail below. Depending on the design, the complete set of input data or parts of the input data may be stored in the input buffer. Additionally, an operation specific configuration is required to perform the intended operation via the crypto or hash accelerator block 210. Moreover, the complete output data or portions thereof may be stored in the output buffer.

The end of the operation is signaled to a processing block (e.g. the processing block 108) either by a status flag, which can be polled, or via the use of an interrupt (not shown). Thus, after finishing one operation, the operation specific configuration (e.g. the configuration data) and the data transfer (the input data) need to be transferred to the crypto or hash accelerator block 210 multiple times, as shown in FIG. 2. This is independent of whether the crypto or hash accelerator block 210 is a secondary module or has its own primary interface.

It is noted that, for many PQC algorithms, a large number of similar cryptographic operations need to be performed sequentially. In this context, the term "similar" refers to a significant portion of input data (e.g. the seed) being the same for a certain set of operations, as well as the operation specific configuration (i.e. identified by the configuration data) being the same for a certain set of operations. Thus, using classical crypto or hash accelerators, such as those implemented via the conventional expander 204, multiple reads and writes are required for each instance of input data, which in each case contains mostly the same data. Also, it is generally required in many applications to rewrite the operation specific configuration, even though it is also the same as the previous operations. For example, and with reference to the PQC expander architecture 200 as shown in FIG. 2, the key part 1 may be the same for multiple operations, as only the last bytes 'i' an 'j' are changed, but the entirety of the input data still needs to be written to the input buffer for each sequential operation. Thus, conventional PQC expanders require significant processing overhead, which the embodiments described in further detail herein function to reduce to provide for more efficient operation.

III. An Example POC Accelerator Architecture

The use of the embodiments as described herein may be advantageous for PQC algorithms by providing solutions that decrease memory use, reduce the requirements for memory, and reduce processing overhead, as further discussed herein. However, although the embodiments disclosed herein are described with respect to PQC algorithms, this is by way of example and not limitation, and the embodiments may be implemented in accordance with any suitable type of symmetric or asymmetric cryptography. The embodiments described herein may be particularly useful for implementation with respect to the use of PQC algorithms or other suitable algorithms that implement key expansion, as the increase in efficiency may be leveraged to provide significant improvements in such scenarios.

For example, the embodiments as discussed herein (e.g. the PQC accelerator 302 and/or the expander 404) may be implemented to perform any suitable number and/or type of cryptographic-based functions using key expansion. Such PQC algorithms may be implemented in accordance with the embodiments discussed herein to perform cryptographic-based functions such as the use of a Digital Signature Algorithm (DSA) to provide an expanded key for the digital signature of data messages and/or to verify the authenticity of a digitally-signed message. As noted above, some examples of PQC algorithms used for a DSA may comprise CRYSTALS-DILITHIUM, Falcon, and SPHINCS+. The embodiments as described herein may additionally or alternatively be implemented to perform cryptographic-based functions in accordance with a Key Encapsulation Mechanism (KEM), with examples of PQC algorithms including CRYSTALS-KYBER, which may implement expanded key functionality to perform key generation, encapsulation, and/ or decapsulation, and thus the cryptographic-based functions may comprise the encryption of plaintext and/or the decryption of ciphertext to provide plaintext using CRYSTALS-KYBER or any other suitable PQC algorithms that leverage key expansion. For KEM applications, the plaintext may represent, for example, a key that is used in accordance with symmetric encryption. Additional examples of the PQC algorithms that may be implemented in accordance with the embodiments described herein include SABER.

Furthermore, the embodiments as further discussed herein may be implemented in accordance with any suitable application in which PQC algorithms are used. Examples of such applications that implement DSA include automotive applications, in which a secure boot process is used to perform software verification, as well as diagnostic systems that perform a secure authentication of diagnostic data. Examples of applications that implement KEM comprise automotive applications such as performing a key exchange for the IEEE 802.1AE (MACsec) standard, which specifies a set of protocols to meet the security requirements for protecting data traversing Ethernet LANs, IPsec, Transport Layer Security (TLS) communications, etc. The use of the embodiments described herein in accordance with automotive applications is also provided by way of example and not limitation, and the embodiments herein may be implemented in accordance with any suitable application that utilizes cryptographic algorithms and cryptographic-based functions.

Figure 3:
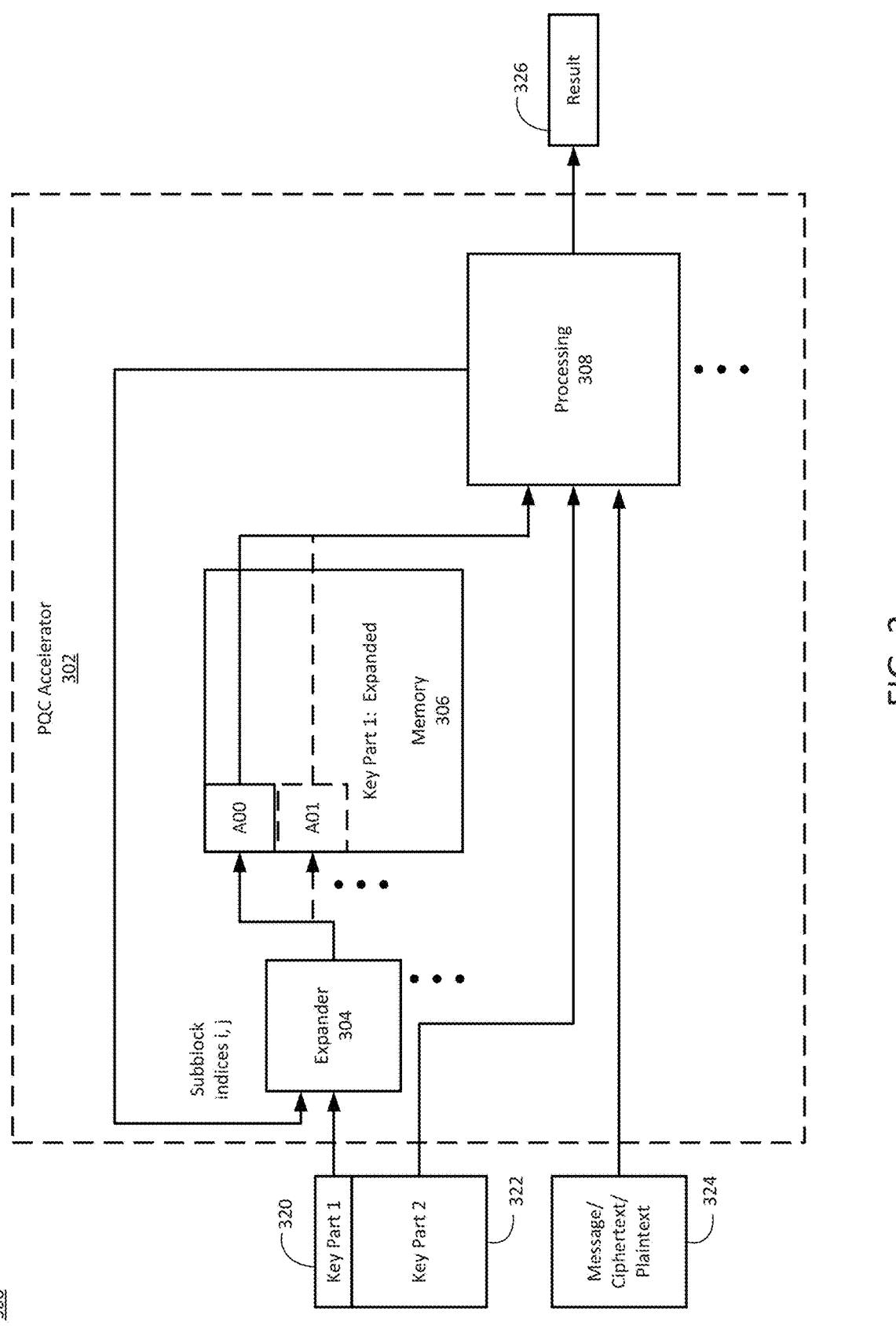
FIG. 3 illustrates a block diagram of an example accelerator architecture, in accordance with an embodiment of the disclosure.

FIG. 3 illustrates a block diagram of an accelerator architecture, in accordance with an embodiment of the disclosure. The accelerator architecture 300 comprises a PQC accelerator 302 (also referred to herein as a PQC hardware accelerator), which includes an expander block 304, a memory 306, and a processing block 308. The PQC accelerator 302 also includes data buffers 320, 322, 324, and 326, which may comprise any suitable type of registers, data banks, memory, etc., and which are configured to temporarily hold their respective data values. Furthermore, for purposes of brevity, additional components identified with the flow of data among the various components of the accelerator architecture 300 are not shown. For example, the PQC accelerator 302, as well as any other suitable components of the accelerator architecture 300, may comprise any suitable number and/or type of data interfaces, ports, buses, interconnections, etc., which facilitate the flow of data among the various components of the accelerator architecture 300. The flow of data in this manner is represented by the various arrows as shown in FIG. 3.

The expander block 304, which may also be referred to herein as an expander, may comprise any suitable number and/or type of hardware components, hardware circuitry, software, or combinations of these. The expander 304 is configured to perform any suitable number and/or type of key expansion functions, which may comprise those discussed herein with respect to any suitable PQC algorithms, for example. However, instead of generating the entire expanded key at once, as discussed herein with respect to the expander 104, the expander 304 sequentially generates expanded data fragments (also referred to herein simply as data fragments) of the expanded key. Thus, and as further discussed below, the processing block 308 may "consume" each data fragment to obtain the expanded key by way of an iterative aggregation of the sequentially generated data fragments. Because of the sequential nature in which the data fragments are consumed, a portion of the memory 306 may be shared between successively generated data fragments. That is, as the previously stored data fragments are consumed by the processing block 308, this data may be overwritten by the expander 304 with newly generated data fragments. This enables a significant reduction in the memory required, as the memory 306 only needs to store data fragments identified with the expanded key data fragments instead of the entirety of the expanded key, as is the case for conventional PQC accelerators.

In some embodiments, the expander 304 is configured to perform a single, predetermined key expansion function in accordance with a predetermined configuration, which is based upon the particular PQC algorithm that is being implemented by the PQC accelerator 302. In other embodiments, the expander 304 is configured to perform different key expansion functions in accordance with respective configurations, each being based upon the particular PQC algorithm that is implemented by the PQC accelerator 302 at a particular time. In any event, the configuration data provided to the expander 304, which is not shown in FIG. 3 for purposes of brevity, may comprise cryptographic configuration parameters and/or other suitable parameters that define how the data fragments of the expanded key are to be sequentially generated. Additional details regarding the cryptographic configuration parameters, which is also referred to herein as configuration data, is further discussed below with respect to FIG. 4.

To this end, additional details of the PQC key expansion process are now provided for the sake of clarity. The embodiments discussed herein function to perform key expansion from smaller seed values, which may comprise keys (e.g. public or private keys) or portions of such keys, and which are commonly used in many types of known PQC cryptosystems. For instance, the buffer 320 may store a key part 1, a portion (or the entirety thereof) comprising a seed value as discussed herein. Thus, the seed value may be identified with a portion of a cryptographic key, which may comprise the key part 1 and the key part 2 as shown in FIG. 3, for example. As further discussed herein, once the seed value is used to provide the expanded key, the processing block 308 may utilize this expanded key in conjunction with the other portion of the key (i.e. the key part 2) to perform various cryptographic-based functions on the data that is stored in the data buffer 324. This data may represent, for example, a message, ciphertext, etc., based upon the particular cryptographic-based function being performed by the processing block 308. The manner in which the expanded key is used in conjunction with the data stored in the buffer 324 to perform the various cryptographic-based functions is generally known, and thus additional details regarding this process is not provided for purposes of brevity. However, the manner in which the expanded key is obtained using the sequentially data fragments differs from the conventional use of expansion functions.

To clarify the principle of key expansion, it is noted that for many PQC algorithms, the processing (e.g. the specific cryptographic-based function that is performed) requires objects/keys that are expanded from smaller seeds. The expanded key is formed of several smaller sub-parts, which are also referred to herein as sub-blocks, as each sub-part may be represented as a smaller "block" of digital data with respect to the entire expanded key. As one example, the expanded key may comprise a matrix, and the entries of this expanded key matrix may comprise each of the smaller sub-parts. In other words, the expanded key matrix may comprise a plurality of entries, with each one of the plurality of entries comprising a value. In accordance with some PQC algorithms (e.g. CRYSTALS-DILITHIUM), the entries of the key expansion matrix may be identified with polynomials.

The term "identified with" is used here to convey that some post processing is used to translate the initial output of the expander 304 to the respective matrix entries of the expanded key. In other words, the output of the expander 304 may not necessarily be the final representation of the polynomial of the key expansion matrix. In any event, the output of the expander 304 (e.g. a hash function output) may be mapped to a final representation of the polynomial entries of the key expansion matrix. In other words, the data fragments output by the expander 304 may be identified with the key expansion matrix entries such as polynomials, in the sense that each entry/polynomial may be uniquely derived from (i.e. mapped to) the data fragments output by the expander 304. The post processing used to generate the key expansion matrix entries may be performed, for example, as part of the sub-part operations as discussed herein with respect to the processing block 308. Alternatively, this post processing may be performed by the expander 304, and which may include post processing that is performed by the crypto or hash accelerator block 402 further discussed below with reference to FIG. 4. In this case, the data fragments output by the expander 304 may represent the matrix entries, which are processed by the processing block 308 as part of each respective sub-part operation as discussed in further detail herein. Thus, in some embodiments the data fragments output by the expander 304 may include pre-processed data that, upon being further processed via the processing block 308, result in a conversion of the data fragments into the polynomial matrix entries of the expanded key matrix. In other embodiments, the data fragments output by the expander 304 may already be post-processed, e.g. already represent the respective polynomial matrix entries of the expanded key matrix. In either case, the data fragments are identified with the entries of the expanded key matrix, which again may represent polynomial values. The post-processing that is performed to convert the data fragments into the polynomial values is generally known as part of each respective PQC algorithm, and thus additional details are not provided for purposes of brevity.

Each sub-part (e.g. each matrix entry) is thus expanded deterministically from the seed, independently from the other sub-parts. The embodiments as described herein exploit the fact that the processing of each expanded key sub-part may be completed before the next sub-part is required. As an illustrative example, the verification step again is considered from the CRYSTALS-DILITHIUM PQC algorithm. The matrix $A \in R_q^{k \times \ell}$ is defined by the seed $\rho$, specifically each entry is given by $a_{i,j}=\text{Expand}(\rho, i, j)$, where ExpandA is an expansion function based on SHAKE-128. In this example, the matrix A represents the expanded key, and comprises a number of entries (i.e. sub-parts) represented in Equation 2 below as follows:

$$v = Az = z_0 \cdot \begin{bmatrix} a_{0,0} \\ \vdots \\ a_{k-1,0} \end{bmatrix} + z_1 \cdot \begin{bmatrix} a_{0,1} \\ \vdots \\ a_{k-1,1} \end{bmatrix} + \ldots + z_{\ell-1} \cdot \begin{bmatrix} a_{0,\ell-1} \\ \vdots \\ a_{k-1,\ell-1} \end{bmatrix} = \qquad \text{Eqn. 1}$$

$$\sum_{j=0}^{\ell-1} \left( z_j \cdot \begin{bmatrix} a_{0,j} \\ \vdots \\ a_{k-1,j} \end{bmatrix} \right)$$

With reference to Equation 1 above, for the current example, the z values represent vector coefficients, and thus Az represents a matrix-vector product that is used by the processing block 308 to perform a specific cryptographic-based function, which is a verification step in the current example. The value v represents the intermediate values of the matrix-vector product. The entries of the expanded key matrix A may be defined as having a size of k×l, which are correlated to an index notation in which i represents a row of the expanded key matrix and j represents a column of the expanded key matrix. Each entry of the matrix is a single element of the polynomial ring, i.e., a polynomial with $n=256$ integer coefficients. Thus, the expanded key matrix entry $a_{0,0}$ is identified with $i=0$, $j=0$, i.e. ExpandA($\rho$,0,0). The expanded key matrix entry $a_{0,1}$ is identified with $i=0$, $j=1$, i.e. ExpandA($\rho$,0,1), and so on. Thus, Eqn. 1 shows the breakdown of this calculation into the corresponding vectors. In the algorithm below, it is further described how single elements are expanded and "consumed" in the calculation, while the variable (the memory space) "a" is reused for each entry.

In an embodiment, the expander 304 is configured to iteratively generate, in a sequential manner, each one of the matrix entries $a_{0,1} \ldots a_{i,j}$ as respective data fragments of the expanded key as noted above. In other words, each one of the sequentially generated data fragments may be identified with a different respective one of the plurality of entries of the expanded key matrix. Thus, by computing each summand consecutively, an algorithmic description of this sum may be expressed by the following pseudocode, which may be implemented via the expander 304.

```
1:    v ← 0^{k×1}
2:    for j = 0, ... , 1 – 1 do
3:        for i = 0, ... , k – 1 do
4:            a' = ExpandA(ρ,i,j)
5:            v_i ← v_i + z_j · a'
6:        end for
7:    end for
```

Together, the intermediate values v and a' consist of $k+1$ elements of $R_q$. Again, although the above example is provided with respect to the verification step is considered in the CRYSTALS-DILITHIUM PQC algorithm, this is by way of example and not limitation. The embodiments described herein (e.g. the PQC accelerator 302 and/or the expander 404) may generate the expanded key and/or perform the various cryptographic-based functions in accordance with any suitable PQC algorithm, e.g. CRYSTALS-DILITHIUM, CRYSTALS-KYBER, etc.

Turning back now to FIG. 3, the expander 304 is configured to sequentially generate, from the same seed value, each one of the data fragments of the expanded key, which again may represent each of the matrix entries $a_{0,0} \ldots a_{k-1,l-1}$ of the expanded key matrix A. Each of the sequentially generated data fragments is then stored in the memory 306, which may be implemented as any suitable type of memory for this purpose (e.g. a volatile memory, a non-volatile memory, buffers, data banks, registers, etc.). The processing block 308 is configured to "consume" each of the sequentially generated data fragments, one at a time, to iteratively perform each computation identified with the matrix-vector product Az. For example, the processing block 308 may perform a sequential series of computations that results in an iterative aggregation of the sequentially generated data fragments.

To do so, the processing block 308 may comprise any suitable number and/or type of hardware components, hardware circuitry, software, or combinations of these. For instance, the processing block 308 may be configured in accordance with a hardware implementation, which may comprise any suitable number and/or type of dedicated hardware components such as a microcontroller, an application specific integrated circuit, a field programmable gate array (FPGA), a system on a chip (SoC), dedicated logic and/or other circuitry, etc. As another example, the processing block 308 may be configured in accordance with a software implementation in which instructions are executed to enable the processing block 308 to perform each cryptographic-based function. As another example, the processing block 308 may be configured in accordance with a combination of a hardware and a software implementation, with the different portions thereof performing the various parts (individually or in combination) of each cryptographic-based function.

In any event, the processing block 308 may perform the iterative aggregation of the sequentially generated data fragments based upon the particular PQC algorithm that is implemented. That is, because the expanded key includes sub-parts that may be multiplied by respective values (or subjected to other operations), the processing block 308 may compute the result of each sub-part operation, and add (i.e. aggregate) this result to subsequent sub-part operations in accordance with each sequentially generated data fragment. The processor block 308 may repeat this iterative process of performing a sub-part operation (e.g. multiplication) and adding the result to the previous ones until all sub-part operations have been completed (e.g. until the sub-part operation identified with all matrix entries $a_{0,0} \ldots a_{i,j}$ have been completed). At this point, the resulting aggregation of all sub-part operations is equivalent to the operations being performed using the entire expanded key.

To provide an illustrative example using the verification step as noted above, the processing block 308 may perform a first sub-part operation by multiplying the first vector coefficient $z_0$ by the first expanded key matrix entry $a_{0,0}$ to compute a first summand of the matrix-vector product Az. The processing block 308 may continue to iteratively multiply each one of the generated data fragments of the expanded key by a respective vector coefficient z to iteratively compute each one of the respective summands of the vector-matrix product Az, and then add the result to the previous one as part of the iterative aggregation process. Once this process is completed, the processing block 308 may use the resulting matrix-vector product Az in accordance with the cryptographic-based function.

To perform the iterative aggregation process in this way, each of the expander 304 and the processing block 308 is configured in accordance with cryptographic configuration parameters that define the type of expansion function, how the seed value is used to perform the key expansion via sequential data fragments, as well as the size of the expanded key (e.g. the size of the expanded key matrix and number of entries). Thus, the cryptographic configuration parameters may comprise instructions, logic, code, settings, and/or hardware configuration data that identifies, to the expander 304 and to the processing block 308, how the expanded key is generated, as well as how the expanded key is used to perform a specific type of crypto-graphic-based function as discussed herein. For example, the cryptographic configuration parameters may define a security level and accompanying k and $\ell$ values, which are known parameters in accordance with various PQC algorithms, and thus define the size of the expanded key matrix and the parameters of its generation via data fragments.

In this way, the expander 304 and the processing block 308 each "knows," via the cryptographic configuration parameters, the maximum values for i and j, which are alternatively referred to herein as "sub-block indices." Thus, the processing circuitry 308 is configured to increment the sub-block indices i, j upon completing each iterative aggregation of the sequentially generated data fragments. For example, upon completing the first sub-part operation identified with the matrix entry $a_{0,0}$, the processing circuitry 308 may increment the sub-block indices i, j to 0, 1. Then, the processing block 308 may transmit a control signal to the expander 304 as feedback (sub-block indices i, j as shown in FIG. 3) that is indicative of these sub-block indices. This triggers the expander 308 to perform the expansion of the next data fragment (e.g. matrix entry) of the expanded key, as the change in the sub-block indices indicates that a next respective data fragment of the expanded key should be generated and stored in the memory 306.

Thus, in accordance with an embodiment, the expander 304 is configured to perform the key expansion function to sequentially generate the data fragments of the expanded key. This process is repeated until each one of the plurality of data fragments (e.g. the sub-parts or the entries of the matrix identified with the expanded key) has been generated in accordance with cryptographic configuration parameters that define the size of the expanded key (e.g. the i×j size of the matrix). Likewise, the processing block 308 is configured to iteratively perform the aggregation of the sub-part operations identified with each consecutively generated data fragment of the expanded key until all the sub-part operations have been performed.

Because the expander 304 generates the data fragments of the expanded key in a sequential manner, which may be used independently of one another, the size of the memory 306 may be significantly reduced compared to conventional PQC algorithm architectures. For example, the memory 306 may have a size that is equal to or sufficient to store only a single data fragment, or alternatively be configured to store two or more data fragments depending upon the desired tradeoff between processing speed and memory size for a particular application.

Moreover, the sub-block indices may function to synchronize the processing operations of the expander 304 and the processing block 308. This synchronization enables the processing block 308 to consume a data fragment stored in a first portion of the memory 306 for a current sub-part operation while (or immediately prior to, excepting for communication and read and write latency) the expander 304 writing the next data fragment (to be used by the processing block 308 for the subsequent sub-part operation) to a second portion of the memory 306. Thus, the embodiments as discussed herein recognize that it is not necessary to expand the entire key before processing it. Instead, the "just-in-time" techniques as discussed herein expand the key in data fragments, e.g., one matrix entry at a time, process this data fragment, and then proceed to the next data fragment.

The use of the sub-block indices to coordinate the generation of the data fragments of the expanded key also enables a reduction in data transfers to the PQC accelerator 302. For example, the use of the sub-block indexing system enables the expander 302 to receive the seed value only once prior to performing the key expansion function to sequentially generate the data fragments of the expanded key. This is in contrast with the conventional PQC accelerator architectures, which require the expander to receive the same seed value multiple times, with only the sub-block indices changing in each case, as noted above with respect to the conventional expander 204 of FIG. 2.

Again, as each expanded data fragment only needs to be processed once, and this processing is independent of the other expanded data fragments, the processing block 308 may consume each data fragment and then release a portion of the memory 306 to be overwritten with the next data fragment. For instance, because the processing block 308 no longer requires the previous data fragment once the sub-part operation and aggregation with the previous sub-part operation has been completed, the expander 304 is configured to overwrite each previously-generated data fragment in the memory 306 with a subsequently-generated data fragment. This process may continue until each of the data fragments of the expanded key have been generated and processed by the processing block 308.

As a result, the embodiments discussed herein function to reduce the size of the memory dedicated to the expanded key, which again may be equivalent to the size of a single data fragment in some embodiments. To provide an illustrative example of the advantages of memory size reduction in accordance with the embodiments, an example scenario is provided in which the parameter for security level V of CRYSTALS-DILITHIUM (k=7, $\ell$ =8, q=8380417). In this scenario, the memory required to store the intermediate values v is 6624 bytes. In comparison, the entire matrix A requires 41216 bytes to store. Hence, the PQC accelerator 302 enables a memory footprint that decreases by 84% for this example. In general, the memory footprint of the expanded key and intermediate calculation results is reduced in accordance with Equation 2 below as follows:

$$1 - \frac{\text{size of } v + \text{size of } a'}{\text{size of } A} = 1 - \frac{(k+1) \cdot |R_q|}{k \cdot \ell \cdot |R_q|} = 1 - \frac{k+1}{k \cdot \ell} \%. \qquad \text{Eqn. 2}$$

Thus, the size of the memory 306 may be reduced to a single data fragment size, as noted above. However, to increase throughput and enable pipelined processing, implementing the memory 306 to store twice the data fragment size allows for the expander 304 and the processing 308 to work in parallel. That is, the expander 307 may compute and write the next required data fragment while the processing block 308 consumes the previous data fragment. To further increase the throughput at the cost of an increased area, embodiments include the PQC accelerator 302 comprising multiple expanders 304 and/or multiple processing blocks 308. Providing multiple expanders 304 and/or processing blocks 308 may facilitate parallelized processing of multiple data fragments.

IV. An Example PQC Expander Architecture

Figure 4:
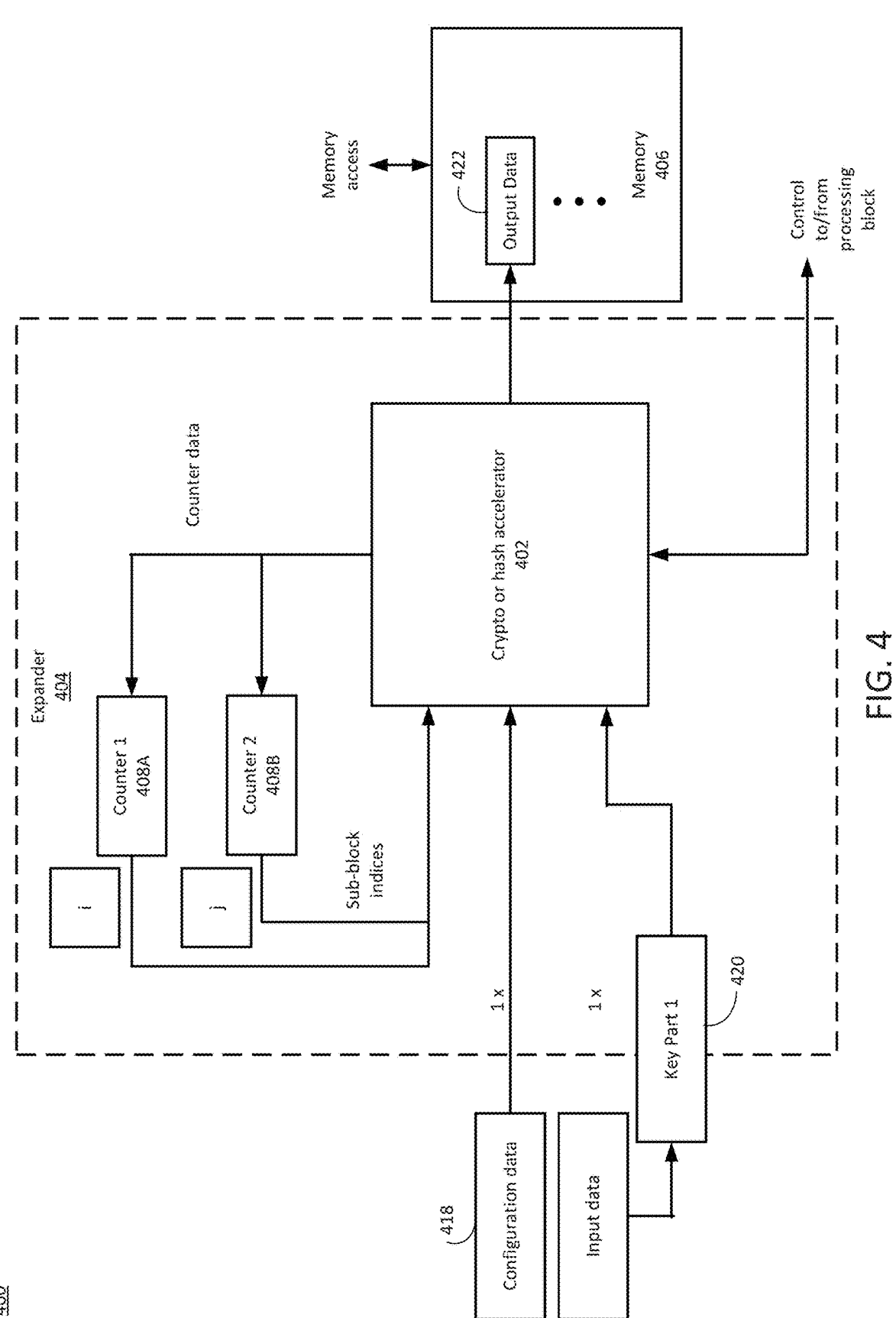
FIG. 4 illustrates a block diagram of an example expander architecture, in accordance with an embodiment of the disclosure.

FIG. 4 illustrates a block diagram of an expander architecture, in accordance with an embodiment of the disclosure. The expander architecture 400 comprises an expander 404 and data buffers 418, 420, which may comprise any suitable type of registers, data banks, memory, etc., and which are configured to temporarily hold their respective data values. The expander architecture 400 also comprises a memory 406, which is shown in FIG. 4 as being separate from the expander 404 by way of example and not limitation. The memory 406 may be implemented as any suitable type of memory (e.g. a volatile memory, a non-volatile memory, buffers, data banks, registers, etc.). The memory 406 may be integrated as part of the expander 404 or may comprise a memory that is physically separate from the expander 404. In either case, the expander 404 has dedicated access to the memory 406 and/or a portion of the memory 406. Thus, the memory 406 may be implemented as a physically separate memory dedicated to the expander 404 or, alternatively, as a dedicated portion (e.g. range of addresses) within a larger memory.

As further described below, other components of the system in which the expander architecture 400 is implemented (e.g. other "actors," which may include processing blocks such as the processing block 308 for example) are configured to access to the memory space that is dedicated for the expander 404 (e.g. via the memory access data lines as shown in FIG. 4). For instance, other such components may access the data stored in the memory 406 to perform cryptographic-based functions and/or to read the stored data after a cryptographic-based function has been completed. However, because the memory is dedicated to the expander 404, other such actors do not control this expander-dedicated memory to get access to the data, but instead copy the data to their own memory (which may be also be a dedicated memory or a dedicated region of a larger memory). Upon copying the data accessed from the memory 406 in this manner, the actor (e.g. the processing block 308) may then further process the data, which may include executing the sub-part operations as discussed herein (e.g. the multiplication of the coefficients of z with the respective matrix entry $a_{i,j}$ and subsequent aggregation with other summands).

Furthermore, and as was the case for the accelerator architecture 300, for purposes of brevity additional components identified with the flow of data among the various components of the expander architecture 400 are not shown. For example, the expander 404 and the memory 406 may comprise any suitable number and/or type of data interfaces, ports, buses, interconnections, etc., which facilitate the flow of data among the data buffers 418, 420, the memory 406, the various components of the expander 404, as well as the other actors (e.g. the processing block 308) that are utilized in the system in which the expander 404 is implemented. The flow of data in this manner is represented by the various arrows as shown in FIG. 4.

The expander 404 may be configured to operate as an independent cryptographic "satellite," and thus may be implemented in accordance with any suitable system in which expanded keys are generated. In some embodiments, the expander 404 may be identified with the expander 304, for instance, as discussed above with respect to the PQC accelerator 302 of FIG. 3. Thus, the data buffer 420 and accompanying input data may likewise be identified with the data buffer 320, as shown and discussed herein with respect to FIG. 3, and the memory 406 may be identified with the memory 306 as discussed above with reference to FIG. 3.

In accordance with such embodiments, the functionality and advantages of the PQC accelerator 302 may be combined with the functionality and advantages provided by the expander 404, as further discussed herein. For example, the output data as shown in FIG. 4 may represent the sequentially generated data fragments as discussed above with respect to the expander 304, which are written to the memory 406. Again, portions of the memory 406 may be shared between successively generated data fragments, i.e. portions of the memory 406 may be overwritten with subsequent data fragments upon the previously stored data fragments being consumed by the processing block 308 (or other suitable actor). It is noted that the use of the expander 404 as part of the PQC accelerator 302 of FIG. 3 is provided by way of example and not limitation, and the expander 404 may operate as an independent cryptographic satellite as part of any suitable system, as further noted herein.

The expander 404 also comprises a first counter 408A, a second counter 408B, and a crypto or hash accelerator block 402, which is alternatively referred to herein as "accelerator circuitry." The first and second counters 408A, 408B may be implemented as any suitable type of processors (processing circuitry), hardware components, executed instructions (e.g. software components), or combinations of these. Each of the counters 408A, 408B may be configurable with respect to the range of counter values that it counts up to before being reset. That is, each of the counters 408A, 408B may be configured, by way of the received configuration data provided via the data buffer 418, to count to a maximum counter value before resetting to its initial or default counter value (e.g. 0).

For example, the configuration data may be identified with or otherwise comprise the cryptographic configuration parameters as noted above, which define the type of expansion function, how the seed value is used to perform the key expansion via sequential data fragments (e.g. how the data fragments of the expanded key are to be sequentially generated), as well as the size of the expanded key (e.g. the size of the expanded key matrix and the number of entries). Thus, the counters 408A, 408B may be configured to increment their respective counter values, which may correspond for example to a row index i and a column index j, respectively, of the expanded key matrix as discussed herein. The counters 408A, 408B may be configured to set their maximum count values in accordance with the size of the expanded key that is indicated via the configuration data. To provide an illustrative example, if the configuration data indicates that the expanded key matrix is a size k×l of 5×5, then each of the counters 408A, 408B would be configured to count from a digital value equal to 0 up to a digital value equal to 4, i.e. i and j would range between 0 and 4. The counters 408A, 408B may be configured in this manner via communication with the crypto or hash accelerator block 402, as shown in FIG. 4 via the "counter data." Alternatively, the counters 408A, 408B may access the configuration data stored in the data buffer 418 or otherwise be configured independently via data communications that utilize the configuration data (not shown). As yet another alternative, the counters 408A, 408B may be configured in this manner via communications with an external device (not shown), which may comprise a host device in which the expander 404 is implemented or otherwise forms a part thereof.

In any event, each of the counters 408A, 408B may be configured to independently increment their respective counter values in accordance with any suitable timing schedule to facilitate the crypto or hash accelerator block 402 receiving the next incremented values (i.e. the sub-block indices) after each data fragment is generated as the output data, which is written to any suitable memory. As noted above for the PQC accelerator architecture 300, the data fragments output by the expander 404 may be identified with the entries of the expanded key matrix, and may be processed by the expander 404 or the processing block (e.g. processing block 308) to uniquely derive the matrix entries. For example, the combination of the sub-block indices (which may represent e.g. column and the row indices) indicate to the expander 404 (e.g. the crypto or hash accelerator 402) a next one of the data fragments (e.g. a next one plurality of entries of the key expansion matrix) to generate a respective data fragment of the expanded key. To do so, the counters 408A, 408B may be clocked by any suitable system clock in which the expander 404 is implemented, which may be asynchronous or synchronous with respect to the operation of the crypto or hash accelerator block 402.

For example, the counters 408A, 408B may asynchronously increment their counter values in accordance with a predetermined schedule that ensures that the crypto or hash accelerator block 402 has completed the previous data fragment computation and is thus ready to compute the next sequential data fragment. As another example, the crypto or hash accelerator block 402 may be configured to provide feedback to indicate to the counters 408A, 408B when to increment their respective counter values via the counter data, which may be in accordance with a predetermined sequential order that is known by the crypto or hash accelerator block 402 based upon the configuration data. Thus, the counters 408A, 408B may be configured, upon the crypto or hash accelerator block 402 completing each sequentially generated data fragment of the expanded key, to selectively increment their respective index values to indicate, to the crypto or hash accelerator block 402, a next one of sequentially generated data fragments (e.g. a next one of the plurality of entries of the matrix) to generate with respect to the expanded key.

In this way, it is noted that in accordance with embodiments in which the expander 404 is implemented as the expander 304 of the PQC accelerator 302, the feedback (i.e. the sub-block index control signals) between the processing block 308 and the expander 404 may not be required, as the internal counters 408A, 408B of the expander 404 may indicate to the expander 404 which sub-blocks (i.e. which data fragments) of the expanded key to generate at a particular time. Thus, in this scenario, the control signals that are provided by the processing block 308 are no longer needed to trigger each sequentially generated data fragment as noted above for the PQC accelerator 302. However, it is noted that the expander 404 is not limited to implementations via the PQC accelerator 302, and may be implemented as part of any suitable PQC accelerator architecture, including known PQC accelerator types and/or PQC accelerators other than the PQC accelerator 302.

Thus, through the use of the configuration data, flexible operation of the expander 404 is realized, and may be configured to perform any suitable type of key expansion functions based upon the particular PQC algorithm and/or application. For instance, the crypto or hash accelerator 402 may be configured in accordance with a hardware implementation, which may comprise any suitable number and/or type of dedicated hardware components such as a micro-controller, an application specific integrated circuit (ASIC), a field programmable gate array (FPGA), a system on a chip (SoC), dedicated logic and/or other circuitry, etc. As another example, the crypto or hash accelerator block 402 may be configured in accordance with a software implementation in which instructions are executed to enable the crypto or hash accelerator 402 to perform specific types of key expansion functions. As another example, the crypto or hash accelerator block 402 may be configured in accordance with a combination of a hardware and a software implementation.

In any event, is it noted that the configuration data may comprise cryptographic configuration parameters that include instructions, logic, code, settings, and/or hardware configuration data that identifies, to the crypto or hash accelerator block 402 (and optionally to the counters 408A, 408B and the relevant processing block such as the processing block 308, for example), how the expanded key is generated. For example, and as noted above, the cryptographic configuration parameters may define a security level and accompanying k and ℓ values, which are known parameters in accordance with various PQC algorithms, and thus define the size of the expanded key matrix and the parameters of its generation via the data fragments. Thus, the crypto or hash accelerator block 402 may have a flexible configuration to perform any suitable number and/or type key expansion functions or other suitable functions with respect to the input data, which may be a function of the particular type of PQC algorithm and/or application currently implemented as indicated by the configuration data. The input data may comprise, for instance, a cryptographic key or a portion of a cryptographic key, as noted above for the PQC accelerator 302. For instance, the entirety or portion of the input data may be stored in the data buffer 420, e.g. key part 1, a portion (or the entirety thereof) comprising a seed value as discussed herein.

However, in contrast to conventional expanders, the expander 404 does not need to receive the configuration data and the seed value multiple times as the expanded key is generated. Instead, the configuration data and the input data may be received (e.g. read from their respective data buffers 418, 420) by the crypto or hash accelerator block 402 once (e.g. only once) prior to each of the data fragments being sequentially generated for an expanded key. This is achieved by way of the use of the sub-block indexes that are provided via the counters 408A, 408B internally to the expander 404, which obviates the need to repeatedly receive these sub-block indices (along with their respective seed value) as the data fragments are computed for the same seed value, as was the case for the expander 204. For example, the input data of one operation (e.g. the seed value) may be internally stored by the crypto or hash accelerator block 402 (or stored in the dedicated portion of the memory 406), and thus may be reused for each subsequent key expansion operation. Moreover, because the sub-block indices are generated internally, these may also be attached to the stored input data by the crypto or hash accelerator block 402 instead of being received over multiple data transfers of the input data.

Therefore, the crypto or hash accelerator block 402 may perform multiple operations based on the same input data with incrementing counter values, and all data fragments of the expanded key may be processed with a single data configuration. In other words, the internal counters 408A, 408B output counter values that are appended to the seed value, thereby enabling the crypto or hash accelerator block 402 to repeatedly compute each expanded key data fragment without repeatedly receiving additional seed values, which typically include the same seed value and the appended sub-block indices as noted above with respect to FIG. 2. For example, and as noted above with respect to the PQC accelerator 302, the crypto or hash accelerator block 402 may, upon receiving the configuration data and input data one time (e.g. only once), be triggered to sequentially generate each of the data fragments of the expanded key. Once triggered, this process may continue until each one of the data fragments (e.g. each of the plurality of entries of the matrix) identified with the expanded key has been generated in accordance with cryptographic configuration parameters that define the size of the matrix. This advantageously enables the expander 404 to function as an independent satellite that performs multiple calls, and only needs to be triggered once with a single configuration and seed value to provide all data fragments of a resulting expanded key. This reduces data configuration overhead, data input overhead, and latency compared to the conventional computation of expanded keys.

As each data fragment is output via the crypto or hash accelerator block 402, the follow-up processing by the processing block (e.g. processing block 308) may be performed in various ways depending on the system setup. For example, the crypto or hash accelerator 402 is configured to sequentially generate each of the data fragments of the expanded key, as noted above. Thus, the output data that is accessed and copied by the processing block (e.g. the processing block 308) may comprise data blocks of any suitable size such that the processing block may access and copy from the memory 406 any suitable number of data fragments to perform the respective sub-part operations as discussed herein. For instance, in one scenario the output data may comprise each sequentially generated data fragment, which is accessed via the processing block after each data fragment is stored in the memory 406. As another example scenario, the output data may comprise a larger data block that comprises a concatenation of all data fragments of the expanded key. In this scenario, the processing block may wait until all data fragments have been generated before performing the subsequent sub-part operations.

In various embodiments, the expander 404 may thus be configured such that the sub-part operations are performed each time a data fragment is stored in the memory 406, after all data fragments are stored in the memory 406, or after any suitable number of data fragments less than all data fragments have been stored in the memory 406. In other words, the configuration data may be leveraged to control a granularity with which the stored data fragments are accessed by the processing block to perform the subsequent sub-part operations. Thus, for some applications it may be desirable for the processing block to obtain each data fragment as fast as possible (e.g. as soon as the data fragment is stored), while in other cases it might be more desirable for the processing block to wait for all data fragments to be generated. This latter scenario may be particularly advantageous, for instance, to keep the overhead that is associated with initiating a copying operation low. Thus, the expander 404 may output any suitable number of data fragments, which may be concatenated together into larger data blocks, before being accessed from the memory 406 by the processing block and processed.

In an embodiment, the crypto or hash accelerator 402 may communicate with the processing block (e.g. the processing block 308) via one or more data lines (control to/from processing block) as shown in FIG. 4. The data sent to the processing block via such communications may include any suitable type of control signals that may inform the processing block when the next data block (which again may contain any suitable number, or all, of the data fragments) is available. The information about the availability of data fragments in the memory 406 may be provided to the processing block in any suitable number and/or types of ways via such data communications. For example, the crypto or hash accelerator 402 may implement flags, polling, interrupts, etc., via the use of the control signals that are provided to the processing block, as shown in FIG. 4.

In this way, another significant advantage of the expander 404 is the reduction in the number of interactions required with the processing block, since the configuration data and the input data do not need to be written as each data fragment is accessed and processed. Instead, the size of the data blocks accessed by the processing block may be made available of any suitable size that is best suited to the flow of the processing block. Furthermore, it is noted that the amount of input data to be stored in the expander 404 (e.g. in the crypto or hash accelerator block 402) is generally smaller than the data block length, i.e. the size of the output data block identified with the results written to the memory 406. Therefore, no additional buffers are needed to keep this data in the data buffer 420 over multiple operations. As a result, this feature does not increase the memory area of the expander 404 compared to conventional expanders.

To provide an illustrative example, the verification step again is considered in the CRYSTALS-DILITHIUM PQC algorithm. The matrix $A \in R_q^{k \times \ell}$ is defined by the seed $\rho$, specifically each entry is given by $a_{i,j}$=Expand($\rho$, i, j), where ExpandA is an expansion function based on SHAKE-128. A typical configuration for CRYSTALS-DILITHIUM has $\rho$=256 bit and i and j consisting of 1 byte each. For a security level of V, the largest dimensions are considered with k=8 and $\ell$=7.

These conditions result in the following inputs:

A classical crypto or hash accelerator requires:

$$\text{nrOperations}=k \cdot \ell =56$$

$$\text{transferSize}=(256\text{ bits}+16\text{ bits}) \cdot \text{nrOperations}=1904 \text{ bytes}$$

The expander 404 as described above requires:

nrOperations=1 transferSize=256 bits=32 bytes

Performing this operation using the expander 404 may reduce the number of configuration interactions to a single interaction, or by $k \cdot \ell$ −1=55, which increases, for example, the software stack efficiency significantly. In other words, there are $k \cdot \ell$ elements in the matrix, and only a single configuration is used instead of a configuration per each element. Thus, the reduction is the difference between the two scenarios. Moreover, the bus traffic is reduced by 1872 bytes.

It is noted that the expander 404 utilizes an additional configuration of the selected security level in this example, which may be used to determine the size of the key expansion matrix as noted herein. However, this configuration effort is negligible, as this could be implemented by 2 only bits. The above mentioned conditions thus results in the amount of output data being the same for both conventional crypto or hash accelerators and the expander 404, which illustrates that the input data and the number of interactions are reduced significantly. For instance, the expander 404 may facilitate a reduction in the number of interactions with the processing block by concatenating all outputs of the $k \cdot \ell$ operations and informing the processing block once the operation is finished. For example, only a single polled signal or a single interrupt signal may be required, as noted above. Such a configuration may be particularly advantageous for the interaction of the expander 404 with a software stack. Moreover, for tightly coupled systems, the data fragments identified with the output data may be accessed more frequently via the processing block.

V. Example Process Flows

Figure 5:
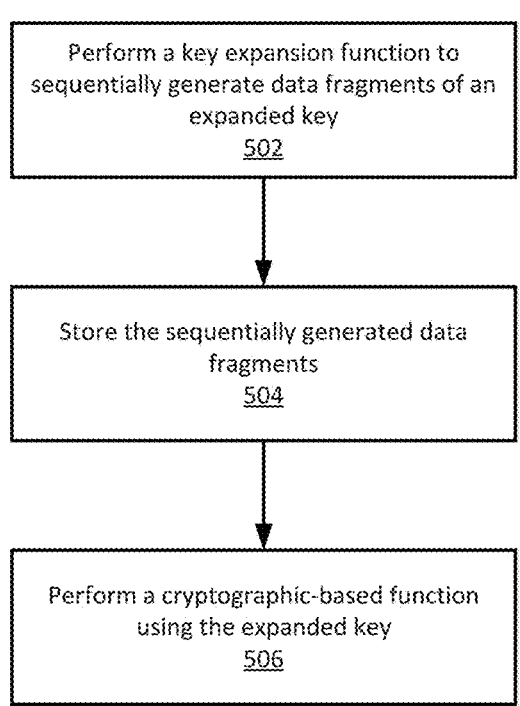
FIG. 5 illustrates a first example process flow, in accordance with an embodiment of the disclosure.

FIG. 5 illustrates an example process flow, in accordance with an embodiment of the disclosure. With reference to FIG. 5, the process flow 500 may be a method executed by and/or otherwise associated with any suitable number and/or type of components such as one or more processors (processing circuitry), hardware components, executed instructions (e.g. software components), or combinations of these. The components may be associated with, for example, one or more components of the PQC accelerator 302 as discussed herein and/or one or more components of the expander 402 as discussed herein. The flow 500 may include alternate or additional steps that are not shown in FIG. 5 for purposes of brevity, and may be performed in a different order than the steps shown in FIG. 5.

Flow 500 may begin with one or more components performing (block 502) a key expansion function. This may include, for example, the expander 304/404 sequentially generating data fragments of an expanded key using a seed value, as noted above. The seed value may be identified, for example, with a portion of a cryptographic key.

The flow 500 may additionally include the one or more components storing (block 504) the sequentially generated data fragments. This may include, for example, the memory 306 storing the sequentially generated data fragments, which may include overwriting previously stored data fragments as these are consumed as part of the iterative aggregation process, as noted herein.

The flow 500 may additionally include the one or more components performing (block 506) at least part of a cryptographic-based function. The cryptographic-based function may comprise, for instance, providing a digital signature, verifying (e.g. for authentication) a digital signature, encrypting plaintext to provide ciphertext, decrypting ciphertext to provide plaintext, etc. The cryptographic-based function may be performed, for example, in accordance with the expanded key based upon an iterative aggregation of the sequentially generated data fragments, as noted herein.

Figure 6:
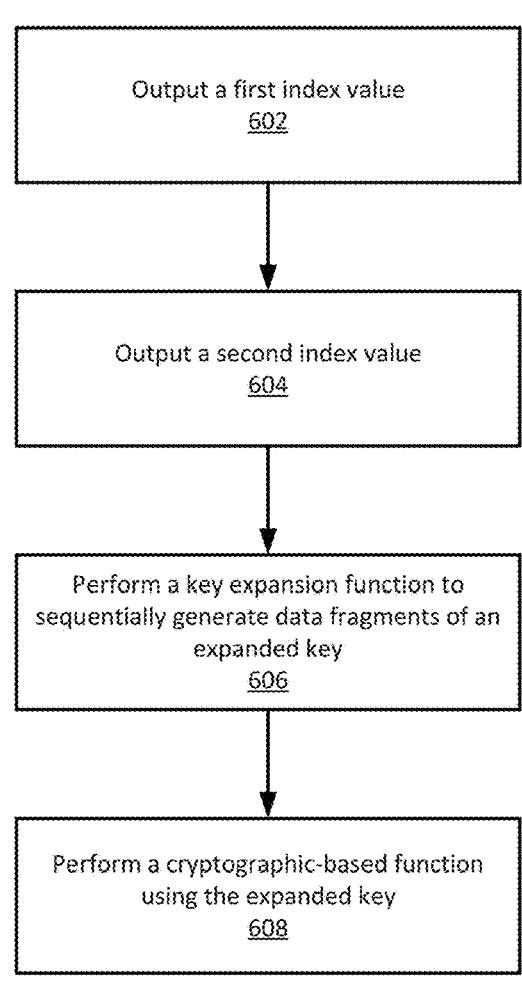
FIG. 6 illustrates a second example process flow, in accordance with an embodiment of the disclosure.

FIG. 6 illustrates an example process flow, in accordance with an embodiment of the disclosure. With reference to FIG. 6, the process flow 600 may be a method executed by and/or otherwise associated with any suitable number and/or type of components such as one or more processors (processing circuitry), hardware components, executed instructions (e.g. software components), or combinations of these. The components may be associated with, for example, one or more components of the PQC accelerator 302 as discussed herein and/or one or more components of the expander 402 as discussed herein. The flow 600 may include alternate or additional steps that are not shown in FIG. 6 for purposes of brevity, and may be performed in a different order than the steps shown in FIG. 6.

Flow 600 may begin with one or more components outputting (block 602) a first index value. This first index value may comprise, for example, a first sub-block index value, as discussed herein, which may be generated via a first counter. For example, the first index value may comprise a row index identified with the plurality of entries of an expanded key matrix.

Flow 600 may additionally include the one or more components outputting (block 604) a second index value. This second index value may comprise, for example, a second sub-block index value, as discussed herein, which may be generated via a second counter. For example, the second index value may comprise a column index identified with the plurality of entries of an expanded key matrix.

Flow 600 may additionally include the one or more components performing (block 606) a key expansion function. This may include, for example, the expander 304/404 sequentially generating data fragments of an expanded key using a seed value, as noted above. The seed value may be identified, for example, with a portion of a cryptographic key. Moreover, a combination of the first and the second index values indicate a next one of the data fragments of the expanded key that is to be generated.

The flow 600 may additionally include the one or more components performing (block 608) at least part of a cryptographic-based function. The cryptographic-based function may comprise, for instance, providing a digital signature, verifying a digital signature (e.g. via authentication), encrypting plaintext to provide ciphertext, or decrypting ciphertext to provide plaintext, etc. The cryptographic-based function may be performed, for example, in accordance with the expanded key based upon an iterative aggregation of the sequentially generated data fragments, as noted herein.

EXAMPLES

The techniques of this disclosure may also be described in the following examples.

Example 1

A post-quantum cryptography (PQC) hardware accelerator, comprising: an expander configured to perform a key expansion function using a seed value by sequentially generating data fragments of an expanded key, the seed value being identified with a portion of a cryptographic key; a memory configured to store the sequentially generated data fragments; and processing circuitry configured to perform a cryptographic-based function in accordance using the expanded key based upon an iterative aggregation of the sequentially generated data fragments.

Example 2

The PQC hardware accelerator of Example 1, wherein the expander is configured to overwrite previously-generated data fragments of the expanded key stored in the memory with subsequently-generated data fragments.

Example 3

The PQC hardware accelerator of any combination of Examples 1-2, wherein the expanded key is associated with a matrix having a plurality of entries, each one of the plurality of entries being identified with a polynomial value.

Example 4

The PQC hardware accelerator of any combination of Examples 1-3, wherein each one of the sequentially generated data fragments is identified with a different one of the plurality of entries of the matrix, and wherein the expander is configured to perform post processing on each one of the sequentially generated data fragments to generate, as each different one of the plurality of entries of the matrix, a respective polynomial value.

Example 5

The PQC hardware accelerator of any combination of Examples 1-4, wherein each one of the sequentially generated data fragments is identified with a different one of the plurality of entries of the matrix, and wherein the processing circuitry is configured to perform post processing on each one of the sequentially generated data fragments to generate, as each different one of the plurality of entries of the matrix, a respective polynomial value.

Example 6

The PQC hardware accelerator of any combination of Examples 1-5, wherein the expander is configured to perform the key expansion function to sequentially generate the data fragments of the expanded key until each one of the plurality of entries has been generated in accordance with cryptographic configuration parameters that define a size of the matrix.

Example 7

The PQC hardware accelerator of any combination of Examples 1-6, wherein the processing circuitry is configured, upon completing each iterative aggregation of the sequentially generated data fragments, to transmit a control signal to the expander indicative of a next one of the plurality of entries of the matrix to generate a respective data fragment of the expanded key.

Example 8

The PQC hardware accelerator of any combination of Examples 1-7, wherein the processing circuitry is configured to perform the iterative aggregation of the sequentially generated data fragments by iteratively multiplying each one of the generated data fragments of the expanded key by a respective vector coefficient to iteratively compute respective summands of a vector-matrix product that is used to perform at least part of the cryptographic-based function.

Example 9

The PQC hardware accelerator of any combination of Examples 1-8, wherein the cryptographic-based function comprises one or more of providing a digital signature, verifying a digital signature, encrypting plaintext to provide ciphertext, or decrypting ciphertext to provide plaintext.

Example 10

The PQC hardware accelerator of any combination of Examples 1-9, wherein the expanded key is generated in accordance with a PQC algorithm that comprises CRYSTALS-DILITHIUM or CRYSTALS-KYBER.

Example 11

The PQC hardware accelerator of any combination of Examples 1-10, further comprising: a first counter configured to increment a row index of the matrix; and a second counter configured to increment a column index of the matrix, wherein a combination of the column and the row indices indicate, to the expander, a next one of the plurality of entries of the matrix to generate a respective data fragment of the expanded key.

Example 12

The PQC hardware of any combination of Examples 1-11, wherein the expander is configured to receive the seed value only once prior to performing the key expansion function to sequentially generate the data fragments of the expanded key.

Example 13

The PQC hardware accelerator of any combination of Examples 1-12, wherein the cryptographic-based function is performed in accordance with a Key Encapsulation Mechanism (KEM) in which the plaintext represents a key used for symmetric encryption.

Example 14

A post-quantum cryptography (PQC) key expander, comprising: a first counter configured to output a first index value; a second counter configured to output a second index value; and accelerator circuitry configured to perform a key expansion function using a seed value by sequentially generating data fragments of an expanded key, the seed value being identified with a portion of a cryptographic key, wherein a combination of the first and the second index values indicate, to the accelerator circuitry, a next one of the data fragments of the expanded key that is to be generated, and wherein the expanded key is used to perform at least part of a cryptographic-based function.

Example 15

The PQC key expander of Example 14, wherein the accelerator circuitry is configured to receive configuration data indicative of parameters that define how the data fragments of the expanded key are to be sequentially generated, and wherein the accelerator circuitry is configured to receive each of the configuration data and the seed value only once prior to the accelerator circuitry performing the key expansion function to sequentially generate the data fragments of the expanded key.

Example 16

The PQC key expander of any combination of Examples 14-15, wherein the expanded key is associated with a matrix having a plurality of entries, each one of the plurality of entries being identified with a polynomial value.

Example 17

The PQC key expander of any combination of Examples 14-16, wherein the first index value comprises a row index identified with the plurality of entries of the matrix, and wherein the second index value comprises a column index identified with the plurality of entries of the matrix.

Example 18

The PQC key expander of any combination of Examples 14-17, wherein each one of the sequentially generated data fragments is identified with a different one of the plurality of entries of the matrix, and wherein the accelerator circuitry is configured to perform post processing on each one of the sequentially generated data fragments to generate, as each different one of the plurality of entries of the matrix, a respective polynomial value.

Example 19

The PQC key expander of any combination of Examples 14-18, wherein the accelerator circuitry is configured to perform the key expansion function to sequentially generate the data fragments of the expanded key until each one of the plurality of entries of the matrix has been generated in accordance with cryptographic configuration parameters that define a size of the matrix.

Example 20

The PQC key expander of any combination of Examples 14-19, wherein the first and the second counter is each configured, upon the accelerator circuitry completing each sequentially generated data fragment of the expanded key, to selectively increment the first index value and the second index value, respectively, to indicate to the accelerator circuitry a next one of the plurality of entries of the matrix to generate a respective data fragment of the expanded key.

Example 21

The PQC key expander of any combination of Examples 14-20, wherein the cryptographic-based function comprises one or more of providing a digital signature, authenticating a digital signature, encrypting plaintext to provide ciphertext, or decrypting ciphertext to provide plaintext.

Example 22

The PQC key expander of any combination of Examples 14-21, wherein the expanded key is generated in accordance with a PQC algorithm that comprises CRYSTALS-DIL-ITHIUM or CRYSTALS-KYBER.

Example 23

The PQC key expander of any combination of Examples 14-22, wherein the accelerator circuitry is configured to write output data comprising one or more of the sequentially generated data fragments of the expanded key to a memory, and wherein processing circuitry copies the output data from the memory to perform at least part of the cryptographic-based function.

Example 24

The PQC key expander of any combination of Examples 14-23, wherein the output data comprises one or more generated data fragments of the expanded key from among the sequentially generated data fragments.

Example 25

The PQC key expander of any combination of Examples 14-24, wherein the output data comprises each one of the sequentially generated data fragments of the expanded key.

An apparatus as shown and described.

A method as shown and described.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore, the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A post-quantum cryptography (PQC) hardware accelerator, comprising:

accelerator circuitry configured to perform a key expansion function using a seed value by sequentially generating data fragments of an expanded key, the seed value being identified with a portion of a cryptographic key, and the expanded key being associated with a matrix having a plurality of entries, each one of the plurality of entries being identified with a polynomial value;

a memory configured to store the sequentially generated data fragments; and processing circuitry configured to perform a cryptographic-based function using the expanded key based upon an iterative aggregation of the sequentially generated data fragments by iteratively multiplying each one of the generated data fragments of the expanded key by a respective vector coefficient to iteratively compute respective summands of a vector-matrix product that is used to perform at least part of the cryptographic-based function.

2. The PQC hardware accelerator of claim 1, wherein the accelerator circuitry is configured to overwrite previously-generated data fragments of the expanded key stored in the memory with subsequently-generated data fragments.

3. The PQC hardware accelerator of claim 1, wherein each one of the sequentially generated data fragments is identified with a different one of the plurality of entries of the matrix, and wherein the accelerator circuitry is configured to perform post processing on each one of the sequentially generated data fragments to generate, as each different one of the plurality of entries of the matrix, the respective polynomial value.

4. The PQC hardware accelerator of claim 1, wherein each one of the sequentially generated data fragments is identified with a different one of the plurality of entries of the matrix, and wherein the processing circuitry is configured to perform post processing on each one of the sequentially generated data fragments to generate, as each different one of the plurality of entries of the matrix, the respective polynomial value.

5. The PQC hardware accelerator of claim 1, wherein the accelerator circuitry is configured to perform the key expansion function to sequentially generate the data fragments of the expanded key until each one of the plurality of entries has been generated in accordance with cryptographic configuration parameters that define a size of the matrix.

6. The PQC hardware accelerator of claim 1, wherein the processing circuitry is configured, upon completing each iterative aggregation of the sequentially generated data fragments, to transmit a control signal to the accelerator circuitry indicative of a next one of the plurality of entries of the matrix to generate a respective data fragment of the expanded key.

7. The PQC hardware accelerator of claim 1, wherein the cryptographic-based function comprises one or more of providing a digital signature, verifying a digital signature, encrypting plaintext to provide ciphertext, or decrypting ciphertext to provide plaintext.

8. The PQC hardware accelerator of claim 1, wherein the expanded key is generated in accordance with a PQC algorithm that comprises CRYSTALS-DILITHIUM or CRYSTALS-KYBER.

9. The POC hardware accelerator of claim 1, wherein the accelerator circuitry is configured to receive the seed value only once prior to performing the key expansion function to sequentially generate the data fragments of the expanded key.

10. The PQC hardware accelerator of claim 1, wherein the cryptographic-based function is performed in accordance with a Key Encapsulation Mechanism (KEM) in which the plaintext represents a key used for symmetric encryption.

11. A post-quantum cryptography (PQC) key expander, comprising:

a first counter configured to output a first index value;

a second counter configured to output a second index value; and accelerator circuitry configured to perform a key expansion function using a seed value by sequentially generating data fragments of an expanded key, the seed value being identified with a portion of a cryptographic key, and the expanded key being associated with a matrix having a plurality of entries, each one of the plurality of entries being identified with a polynomial value, wherein a combination of the first and the second index values indicate, to the accelerator circuitry, a next one of the data fragments of the expanded key that is to be generated, wherein the expanded key is used to perform at least part of a cryptographic-based function, wherein the first index value comprises a row index identified with the plurality of entries of the matrix, and wherein the second index value comprises a column index identified with the plurality of entries of the matrix.

12. The PQC key expander of claim 11, wherein the accelerator circuitry is configured to receive configuration data indicative of parameters that define how the data fragments of the expanded key are to be sequentially generated, and wherein the accelerator circuitry is configured to receive each of the configuration data and the seed value only once prior to the accelerator circuitry performing the key expansion function to sequentially generate the data fragments of the expanded key.

13. The PQC key expander of claim 11, wherein each one of the sequentially generated data fragments is identified with a different one of the plurality of entries of the matrix, and wherein the accelerator circuitry is configured to perform post processing on each one of the sequentially generated data fragments to generate, as each different one of the plurality of entries of the matrix, the respective polynomial value.

14. The PQC key expander of claim 11, wherein the accelerator circuitry is configured to perform the key expansion function to sequentially generate the data fragments of the expanded key until each one of the plurality of entries of the matrix has been generated in accordance with cryptographic configuration parameters that define a size of the matrix.

15. The PQC key expander of claim 11, wherein the cryptographic-based function comprises one or more of providing a digital signature, authenticating a digital signature, encrypting plaintext to provide ciphertext, or decrypting ciphertext to provide plaintext.

16. The PQC key expander of claim 11, wherein the expanded key is generated in accordance with a PQC algorithm that comprises CRYSTALS-DILITHIUM or CRYSTALS-KYBER.

17. The PQC key expander of claim 11, wherein the accelerator circuitry is configured to write output data comprising one or more of the sequentially generated data fragments of the expanded key to a memory, and wherein the processing circuitry is configured to copy the output data from the memory to perform at least part of the cryptographic-based function.

18. The PQC key expander of claim 17, wherein the output data comprises one or more of the generated data fragments of the expanded key from among the sequentially generated data fragments.

19. The PQC key expander of claim 17, wherein the output data comprises each one of the sequentially generated data fragments of the expanded key.

20. A post-quantum cryptography (PQC) hardware accelerator, comprising:

accelerator circuitry configured to perform a key expansion function using a seed value by sequentially generating data fragments of an expanded key, the seed value being identified with a portion of a cryptographic key, and the expanded key being associated with a matrix having a plurality of entries, each one of the plurality of entries being identified with a polynomial value;

a first counter configured to increment a row index of the matrix;

a second counter configured to increment a column index of the matrix, wherein a combination of the column and the row indices indicate, to the accelerator circuitry, a next one of the plurality of entries of the matrix to generate a respective data fragment of the expanded key;

a memory configured to store the sequentially generated data fragments; and processing circuitry configured to perform a cryptographic-based function using the expanded key based upon an iterative aggregation of the sequentially generated data fragments.

21. The PQC hardware accelerator of claim 20, wherein the accelerator circuitry is configured to overwrite previously-generated data fragments of the expanded key stored in the memory with subsequently-generated data fragments.

22. The PQC hardware accelerator of claim 20, wherein the cryptographic-based function comprises one or more of providing a digital signature, verifying a digital signature, encrypting plaintext to provide ciphertext, or decrypting ciphertext to provide plaintext, and wherein the expanded key is generated in accordance with a PQC algorithm that comprises CRYSTALS-DILITHIUM or CRYSTALS-KYBER.

23. A post-quantum cryptography (PQC) key expander, comprising:

a first counter configured to output a first index value;

a second counter configured to output a second index value; and accelerator circuitry configured to perform a key expansion function using a seed value by sequentially generating data fragments of an expanded key, the seed value being identified with a portion of a cryptographic key, and the expanded key being associated with a matrix having a plurality of entries, each one of the plurality of entries being identified with a polynomial value, wherein a combination of the first and the second index values indicate, to the accelerator circuitry, a next one of the data fragments of the expanded key that is to be generated, wherein the expanded key is used to perform at least part of a cryptographic-based function, and wherein the first and the second counter is each configured, upon the accelerator circuitry completing each sequentially generated data fragment of the expanded key, to selectively increment the first index value and the second index value, respectively, to indicate to the accelerator circuitry a next one of the plurality of entries of the matrix to generate a respective data fragment of the expanded key.

24. The PQC key expander of claim 23, wherein the accelerator circuitry is configured to overwrite previously-generated data fragments of the expanded key stored in a memory with subsequently-generated data fragments.

25. The PQC key expander of claim 23, wherein the cryptographic-based function comprises one or more of providing a digital signature, verifying a digital signature, encrypting plaintext to provide ciphertext, or decrypting ciphertext to provide plaintext, and wherein the expanded key is generated in accordance with a PQC algorithm that comprises CRYSTALS-DIL-ITHIUM or CRYSTALS-KYBER.

* * * * *